(12) United States Patent
Shin

(10) Patent No.: US 9,317,242 B2
(45) Date of Patent: Apr. 19, 2016

(54) DATA OPERATION METHOD FOR TERMINAL INCLUDING THREE-PIECE DISPLAY UNITS AND TERMINAL SUPPORTING THE SAME

(75) Inventor: Seung Gi Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 466 days.

(21) Appl. No.: 13/025,684

(22) Filed: Feb. 11, 2011

(65) Prior Publication Data

US 2011/0199361 A1    Aug. 18, 2011

(30) Foreign Application Priority Data

Feb. 12, 2010    (KR) ........................ 10-2010-0013295

(51) Int. Cl.
*G06F 3/14*    (2006.01)
*G06F 1/16*    (2006.01)
*H04M 1/02*    (2006.01)

(52) U.S. Cl.
CPC ............ *G06F 3/1423* (2013.01); *G06F 1/1616* (2013.01); *G06F 1/1647* (2013.01); *G06F 1/1692* (2013.01); *H04M 1/0214* (2013.01); *G09G 2330/021* (2013.01); *G09G 2330/026* (2013.01); *G09G 2340/0492* (2013.01); *H04M 2250/16* (2013.01)

(58) Field of Classification Search
CPC ... G06F 3/1423; G06F 1/1616; G06F 1/1649; G06F 3/1431; G06F 1/1647; G06F 1/3265; G06F 3/1446; G06F 1/1677; G06F 1/3203; G06F 1/1641; G06F 3/1438; G06F 1/165

USPC ........... 345/1.1, 1.3, 156, 169, 2.2, 173, 211, 345/212, 907; 455/566, 574, 158.4; 361/679.27, 679.04, 679.06, 679.29; 715/761; 713/320, 324

See application file for complete search history.

(56) References Cited

U.S. PATENT DOCUMENTS 5,881,299 A    3/1999    Nomura et al.
6,144,358 A *  11/2000   Narayanaswamy et al. .. 345/102

(Continued)

FOREIGN PATENT DOCUMENTS

CN    1230724 A    12/2005
CN    101086831 A    12/2007

(Continued)

*Primary Examiner* — Koosha Sharifi-Tafreshi
(74) *Attorney, Agent, or Firm* — Jefferson IP Law, LLP (57) ABSTRACT

A data operation method for a terminal including three-piece display units and a terminal supporting the same are provided. The terminal including three-piece display units including a first display unit and a second display unit disposed adjacent to each other, a third display unit disposed on an opposite side of the first display unit and the second display unit, a storage unit for storing at least one of a display unit power control mode set value controlling power supplied to at least one of the first display unit, the second display unit, and the third display unit or a data output direction control mode set value used for instructing data to be output, which is generated according to activation of an application program, to at least one of the first display unit, the second display unit, and the third display unit, and a control unit controlling output of data corresponding to at least one application program to at least one display unit activated according to at least one of the display unit power control mode set value or the data output direction control mode set value.

16 Claims, 8 Drawing Sheets

(56) References Cited

U.S. PATENT DOCUMENTS

| | | | |
|---|---|---|---|
| 6,509,911 B1* | 1/2003 | Shimotono | 715/761 |
| 7,844,301 B2 | 11/2010 | Lee et al. | |
| 7,917,993 B2 | 4/2011 | Park | |
| 2002/0109662 A1* | 8/2002 | Miller | 345/100 |
| 2003/0231143 A1* | 12/2003 | Nakamura et al. | 345/1.1 |
| 2004/0051679 A1* | 3/2004 | Ponx | 345/1.1 |
| 2005/0134524 A1* | 6/2005 | Parker et al. | 345/1.1 |
| 2005/0248501 A1 | 11/2005 | Kim | |
| 2006/0183505 A1* | 8/2006 | Willrich | 455/566 |
| 2007/0115202 A1* | 5/2007 | Kiesenhofer | 345/1.1 |
| 2007/0285572 A1* | 12/2007 | Jung | 348/569 |
| 2008/0051027 A1* | 2/2008 | Lee | 455/3.06 |
| 2009/0295810 A1 | 12/2009 | Endo | |
| 2009/0296331 A1* | 12/2009 | Choy | 361/679.09 |
| 2010/0138768 A1* | 6/2010 | Lonkar et al. | 715/769 |
| 2010/0138780 A1* | 6/2010 | Marano et al. | 715/804 |
| 2010/0302219 A1* | 12/2010 | Kitashou | 345/204 |
| 2010/0328331 A1* | 12/2010 | Iwaki et al. | 345/547 |
| 2011/0047459 A1* | 2/2011 | Van Der Westhuizen | 715/702 |
| 2011/0109608 A1* | 5/2011 | Kim | 345/211 |

FOREIGN PATENT DOCUMENTS

| | | |
|---|---|---|
| JP | 2005-215453 A | 8/2005 |
| JP | 2009288430 A | 12/2009 |
| KR | 10-2006-0057465 A | 5/2006 |
| KR | 10-2006-0086923 A | 8/2006 |
| KR | 10-0755851 B1 | 9/2007 |
| KR | 10-2007-0097395 A | 10/2007 |
| RU | 2002115065 A | 3/2004 |
| WO | 2009/143294 A2 | 11/2009 |

* cited by examiner

DATA OPERATION METHOD FOR TERMINAL INCLUDING THREE-PIECE DISPLAY UNITS AND TERMINAL SUPPORTING THE SAME

PRIORITY

This application claims the benefit under 35 U.S.C. §119 (a) of a Korean patent application filed on Feb. 12, 2010 in the Korean Intellectual Property Office and assigned Serial No. 10-2010-0013295, the entire disclosure of which is hereby incorporated by reference.

BACKGROUND OF THE INVENTION

1. Field of the Invention

The present invention relates to a terminal. More particularly, the present invention relates to an operation method of various application programs through data output in a terminal with three-piece display units and a terminal supporting the same.

2. Description of the Related Art

With recent developments in technology for miniaturizing the size of a terminal while maintaining a battery's electric capacity, various functions have been implemented. For example, the terminal has a file play function for playing an audio file and a video file that includes previously stored music for listening thereto. Further, the terminal includes various additional functions such as a camera function for photographing still images or a video camera function for tracking and photographing moving images. Moreover, the terminal provides a function for forming a communication channel with a specific terminal located at a near distance, exchanging and controlling data as well as a mobile communication function using a base station. In addition, the terminal may access an Internet to support reading and downloading various information provided from the Internet.

Since a conventional terminal emphasizes portability, it has a disadvantage in that a viewing area of a display unit is very narrow. To address the foregoing disadvantage, various methods increasing the viewing area of the display unit have been suggested. However, an amount of data capable of being output through one display unit is restricted.

Therefore, a need exists for a data operation method of a terminal capable of solving a size limitation of a display unit and suitably outputting data corresponding to an application program.

SUMMARY OF THE INVENTION

An aspect of the present invention is to address the above mentioned problems and/or disadvantages and to provide at least the advantages described below. Accordingly, an aspect of the present invention is to provide a data operation method for a terminal including three-piece display units and a terminal supporting the same for operating the three-piece display units and for actively and dynamically performing data output according to activation of various application programs to maximize the utility of the terminal.

In accordance with an aspect of the present invention, a data operation method for a terminal including three-piece display units is provided. The method includes selecting at least one of setting a display unit power control mode set value used for controlling power supplied to at least one of the three-piece display units or setting a data output direction control mode set value used for instructing data to be output, which is generated according to activation of an application program, to the at least one of the three-piece display units, and outputting data generated by a currently activated application program to the at least one of the three-piece display units, according to at least one of the display unit power control mode set value and the data output direction control mode set value.

In accordance with another aspect of the present invention, a terminal including three-piece display units is provided. The terminal includes first display unit and a second display unit disposed adjacent to each other, a third display unit disposed at another side of the first display unit and the second display unit, a storage unit for storing at least one of a display unit power control mode set value controlling power supplied to at least one of the first display unit, the second display unit, and the third display unit or a data output direction control mode set value used for instructing data to be output, which is generated according to activation of an application program, to at least one of the first display unit, the second display unit, and the third display unit, and a control unit for controlling output of data corresponding to at least one application program to at least one display unit activated according to at least one of the display unit power control mode set value or the data output direction control mode set value.

In a data operation method for a terminal including three-piece display units and a terminal supporting the same according to an exemplary embodiment of the present invention, a user may activate an application program to be used regardless of an environment capable of using the terminal, and easily confirm and operate data output according to a corresponding application program.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted to for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
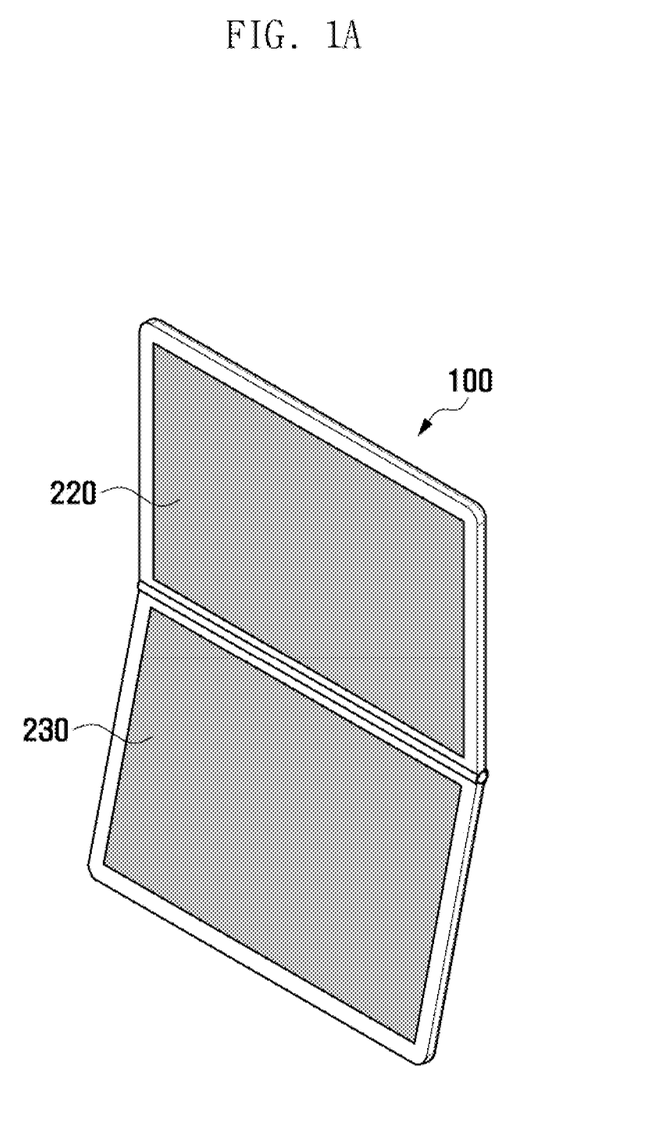
FIG. 1A to FIG. 1C are views schematically illustrating a terminal according to an exemplary embodiment of the present invention.
Figure 1B:
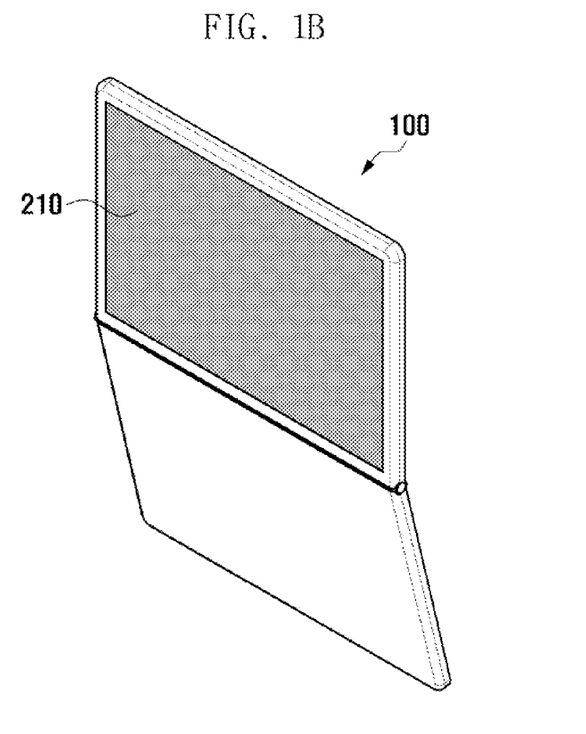
Figure 1C:
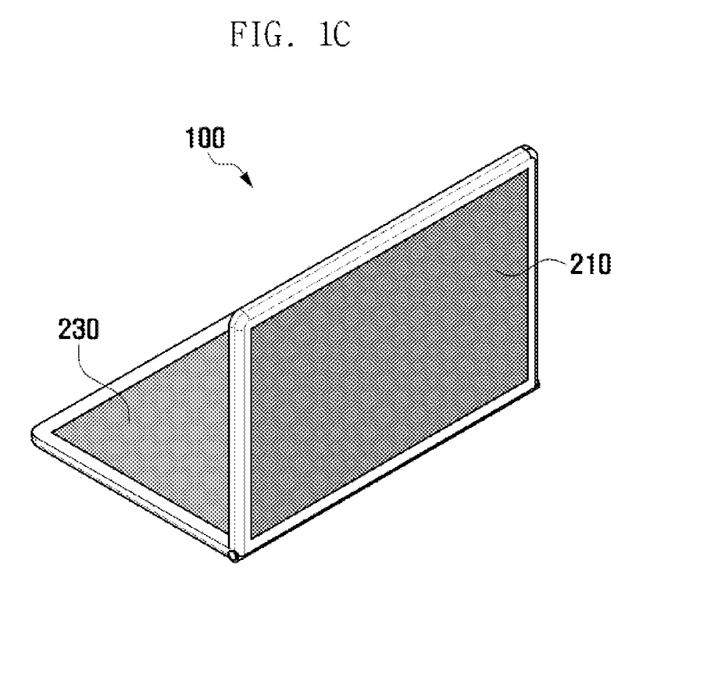
Figure 2:
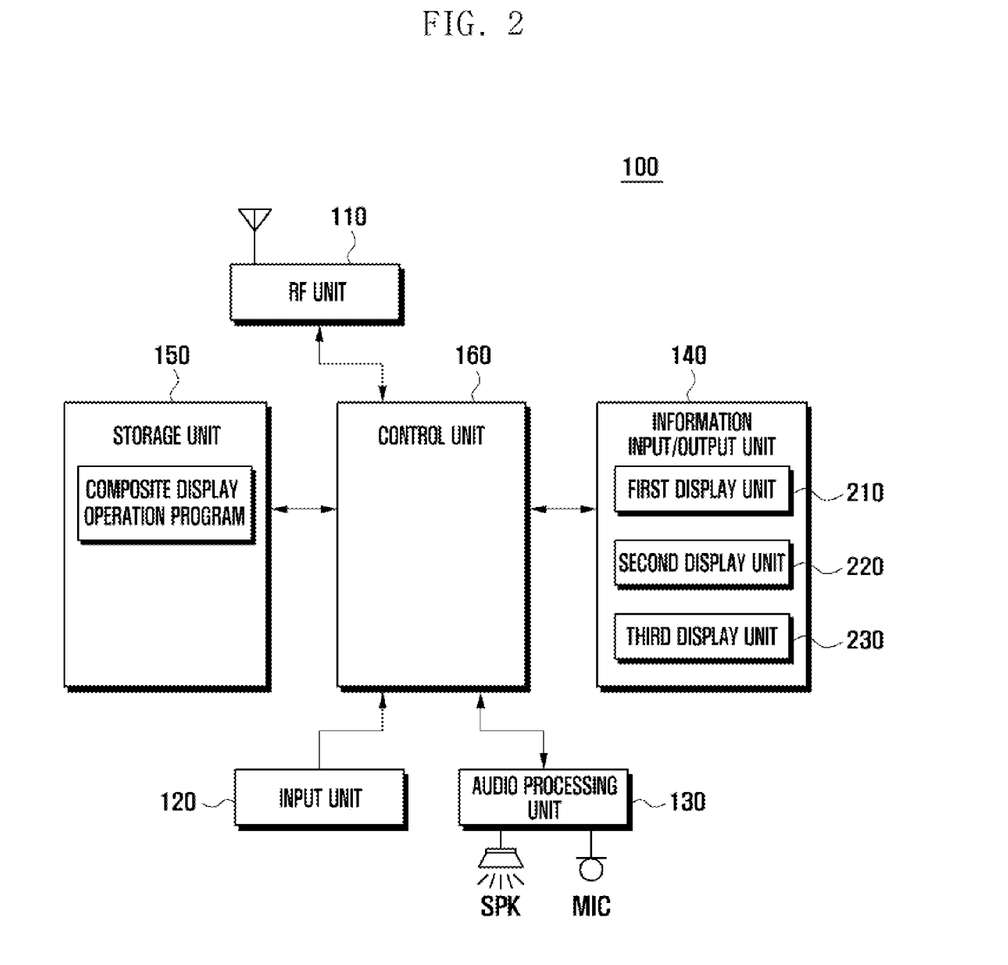
FIG. 2 is a block diagram illustrating a configuration of a terminal according to an exemplary embodiment of the present invention.

FIG. 1A to FIG. 1C are views schematically illustrating a terminal according to an exemplary embodiment of the present invention. FIG. 2 is a block diagram illustrating a configuration of a terminal according to an exemplary embodiment of the present invention.

Hereinafter, exemplary embodiments of the present invention provide a terminal as a folder type terminal by way of example. However, the terminal is not limited to a folder type. That is, the terminal may be equally applicable to a slide type terminal and a bar type terminal. In a case of the slide type terminal, a first display unit and a second display unit may be provided on the same side surface in a slide open state. In this case, a third display unit may be disposed at a rear surface of the first display unit or a rear surface of the second display unit. Further, in a case of a bar type terminal, a first display unit and a second display unit may be mechanically divided at a front surface thereof. A third display unit may be provided at a rear surface of the terminal. In this case, the size of the third display unit is smaller than or equal to that of the first display unit or the second display unit. Further, the size of the third display unit is smaller than, equal to, or larger than the size of both the first display unit and the second display unit. Meanwhile, FIG. 1A illustrates a folder type terminal in which a first display unit and a second display unit are provided on the same plane in a complete open state (i.e., a hinge open state of 180 degrees). FIG. 1B illustrates a folder type terminal in which a third display unit is disposed at a rear surface thereof in a complete open state. Moreover, FIG. 1C illustrates an appearance of a folder terminal in a partial open state, namely, a hinge open state of 90 degrees.

Referring to FIG. 1A to FIG. 2, a terminal 100 according to an exemplary embodiment of the present invention may include a Radio Frequency (RF) unit 110, an input unit 120, an audio processing unit 130, a display means 140 with three-piece display units, a storage unit 150, and a control unit 160. Such a construction has only structural elements for data arrangement and output according to activation of an application program. However, the present invention is not limited to a terminal 100 with only the foregoing structural elements. That is, the terminal 100 may further include other structural elements, for example, a camera unit, a near distance communication unit, and a broadcast receiving unit except for the foregoing structural elements. Furthermore, the terminal 100 may include at least one of various sensors, for example, a geomagnetic sensor, an acceleration sensor to test an operation state of the terminal 100, and may detect an operation state of the terminal 100 using the sensors.

The terminal 100 according to an exemplary embodiment of the present invention having a construction described above supports output of data according to a specific application program to at least one of three-piece display units according to selection of various modes for selectively activating the three-piece display units. Accordingly, a user may easily and conveniently verify data and use data according to various application programs supported by the terminal 100 by activating at least one display unit according to a current environment capable of operating the terminal 100. That is, the terminal 100 may vary data arrangement and output forms of data on the display means 140 according to a set composite display operation mode of the display means 140. In other words, the terminal 100 of an exemplary embodiment of the present invention may activate an application program selected according to an input signal generated by a user and an application program selected according to set schedule information after a booting operation of the terminal, and determine output of data generated by a corresponding application program to which one display unit of the display means 140 according to the set composite display operation mode.

Further, the terminal 100 may determine a form of output data, for example, the size of the data, an output range or direction. Further, the terminal 100 may determine an arranged direction, the size, a range of data to be output on the display means 140, and control data to be output on the display means 140 according to the determined information. Here, the composite display operation mode may include a display unit power control mode and a data output direction control mode.

The display unit power control mode may include a standard power display mode, an entire display mode, a first part display mode, a second part display mode, and a third part display mode. The standard power display mode is set to output data on only a first display unit 210 and a second display unit 220. The entire display mode is set to perform specific data output on all of the first display unit 210, the second display unit 220, and a third display unit 230. The first part display mode is set to turn-off the first display unit 210 and performs specific data output on the third display unit 230 and the second display unit 230. The second part display mode is set to turn-off the second display unit 220 and performs specific data output on the third display unit 230 and the first display unit 210. The third part display mode is set to turn-off the first display unit 210 and the second display unit 220 and performs specific data output on only the third display unit 230.

The data output direction control mode may include a standard output display mode, a first bi-direction display mode, a second bi-direction display mode, and a third bi-direction display mode. The standard output display mode outputs data on only the first display unit 210 and the second display unit 220. The first bi-direction display mode outputs data to be output on the third display unit 230 as data corresponding to data to be output on the first display unit 210. The second bi-direction display mode outputs data to be output on the third display unit 230 as data corresponding to data to be output on the second display unit 220. The third bi-direction display mode divides and outputs data to be output on the first display unit 210 and the second display unit 220. A user may set various data outputs to at least one of the three-piece display units according to a combination of the composite display operation modes. The structural elements of the terminal 100 will be described in detail below.

The RF unit 110 executes signal transmission and reception functions for RF communication of the terminal 100. To do this, the RF unit 110 may include an RF transmitter up-converting a frequency of a transmitted signal and amplifying the signal, and an RF receiver low-noise-amplifying a received signal and down-converting the signal. Further, the RF unit 110 may transfer a signal received through an RF channel to the control unit 160 and transmit a signal provided from the control unit 160 through the RF channel. More particularly, the RF unit 110 may transfer data received from another terminal to a display unit designated in a composite display operation mode under the control of the control unit 160. In this case, a display unit outputting data received through the RF unit 110 may be changed according to a set composite display operation mode.

Moreover, when the RF unit 110 is activated under the control of the control unit 160, various data necessary for operation of the RF unit 110 may be set to be output on the display means 140. Accordingly, when the RF unit 110 is activated, data related to the RF unit 110 may be output on at least one of the display units included in the display means 140. For example, when the RF unit 110 is activated, images related to a call, for example, phone numbers and phone book information may be output on at least one of the first display unit 210 and the third display unit 230. In a case of a video call, picture images may be output. Furthermore, according to activation of the RF unit 110, data containing images related to a call control may be output on the second display unit 220. In the meantime, the RF unit 110 may form a data communication channel with a web server according to a user request, and receive specific data, for example, data corresponding to a web page from a corresponding web server. The received data may be output on at least one of the display units included in the display means 140 under the control of the control unit 160.

The input unit 120 receives and transfers a user's operation signal for controlling a terminal 100 to the control unit 160. To do this, the input unit 120 includes at least one numeric key and character keys for inputting numeric and character information, and control keys for controlling an operation of the terminal 100. More particularly, the input unit 120 includes keys for generating input signals for rearrangement and conversion of an output form of data to be output on the display means 140, for a data output switch between display units, and for selection of an application program, and may generate and transfer a corresponding signal according to a user request to the control unit 160. Moreover, the input unit 120 may include a toggle key, a hot key, or a composite display operation mode selection key for simply selecting various composite display operation modes. Namely, the input unit 120 may include a first key map output through a key or a touch screen selecting one of the standard power display mode, the entire display mode, and the first to third part display modes, and a second key map output through a key or a touch screen selecting one of the standard output display mode and the first to third bi-direction display modes. Here, the specific key or the key map output is described to set the composite display operation mode. However, the present invention is not limited thereto. The terminal 100 according to an exemplary embodiment of the present invention may output a menu screen for setting various composite display operation modes.

The audio processing unit 130 may include a Coder/Decoder (CODEC), a Speaker (SPK) outputting an audio signal decoded based on the CODEC, and a Microphone (MIC) collecting external audio signals. The CODEC may include a data CODEC processing data such as packet data and an audio CODEC processing an audio signal such as voice. Accordingly, the audio processing unit 130 converts a digital audio signal received from the control unit 160 into an analog signal by the audio CODEC at the voice call time of the terminal 100, and plays the analog signal using the SPK. Further, the audio processing unit 130 converts an analog audio signal input from the MIC into a digital audio signal by the audio CODEC, and provides the digital audio signal to the control unit 160. The audio processing unit 130 according to an exemplary embodiment of the present invention may form an audio pass by certain display units under the control of the control unit 160.

In more detail, in a state where specific data are output on the first display unit 210, the second display unit 220, and the third display unit 230 according to a user setting or an application program setting, the audio processing unit 130 may form an audio pass for outputting an audio signal included in data output on the first display unit 210 and the third display unit 230 or an audio signal included in data output on the second display unit 220. That is, the audio processing unit 120 may form an audio pass to adaptively output an audio signal according to an inclusion presence of an audio signal in data to be output on the three display units, variation of data to be output, and previously set information.

Referring to FIG. 1A to FIG. 1C, the display means 140 may include two display units outputting data on the same plane according to a preset user operation, for example, a folder open state, and one display unit located at rear sides of the two display units. A flat panel display such as a Liquid Crystal Display (LCD) or an Organic Lighted Emit Diode (OLED) is applicable to at least one of the first display unit 210, the second display unit 220, and the third display unit 230. In this case, the display unit 150 may include a display panel controller, a memory storing image data, and a display element. Here, the first display unit 210, the second display unit 220, and the third display unit 230 may be implemented by different display elements, respectively. That is, although the first display unit 210 and the second display unit 220 are implemented by an LCD type display, the third display unit 230 may be implemented by an OLED type display. A touch panel may be disposed at an upper side of the foregoing flat panel display. Accordingly, the display means 140 may be manufactured with a touch screen. In this case, the display unit 140 may support functions of an input unit. Accordingly, a user may generate a specific input signal using one of the first display unit 210, the second display unit 220, and the third display unit 230. The first display unit 210, the second display unit 220, and the third display unit 230 may determine the presence of data output and perform output of integration data according to a set composite display operation mode.

For example, the display means 140 may output data on the first display unit 210 and the second display unit 220 according to activation of one application program by dividing an entire screen according to a set condition at the time of setting the entire display mode and the third bi-direction display mode, and output data corresponding to the entire screen on the third display unit 230. In this case, the size of the third display unit 230 may be implemented similar to the size of the first display unit 210 or the second display unit 220. Accordingly, the third display unit 230 may have a screen size smaller than that of data output on the first display unit 210 and the second display unit 220 as the entire screen, and output corresponding data.

Further, when at least two application programs are activated, the display means 140 may separately output data by activated application programs according to a set composite display operation mode. For example, the display means 140 outputs data corresponding to a first application program on the first display unit 210 according to setting the entire display mode and the first bi-direction display mode or the second bi-direction display mode, while the display means 140 is outputting data corresponding to a second application program, data corresponding to the first application program or data corresponding to the second application program may be output on the third display unit 230. Further, the display means 140 divides a display area of the third display unit 230 into two areas according to setting the entire display mode and the third bi-direction display mode, and may output data corresponding to the first application program and data corresponding to the second application program on the two divided areas, respectively. Further, the display means 140 may output data on at least one of the first display unit 210, the second display unit 220, and the third display unit 230 according to a display mode set by a user, namely, a display unit power control mode for saving power. Setting other various composite display operation modes in the control unit 160 will be described below in more detail.

The storage unit 150 includes a program memory and data memories. The program memory stores a program controlling overall operations of the terminal 100, for example, an operating system, a program initializing respective constructions of the terminal 100, for example, the RF unit 110 and the display means 140, and a program setting other constructions, for example, a camera or a broadcasting communication unit. More particularly, a composite display operation program may be stored in the program memory.

The composite display operation program is a program controlling direction and a form of data output according to a composite display operation mode set by the user, and is loaded in the control unit 160 to support the operation of the display means 140. The composite display operation program may include a display unit power control routine and a data output direction control routine. The display unit power control routine may include a first sub-routine, a second sub-routine, a third sub-routine, a fourth sub-routine, and a fifth sub-routine according to setting a user display mode. In this case, the first sub-routine of the display unit power control routine controls supply of power to only the first display unit 210 and the second display unit 220. The second sub-routine of the display unit power control routine controls supply of power to only the first display unit 210 and the third display unit 230. The third sub-routine of the display unit power control routine controls supply of power to only the second display unit 220 and the third display unit 230. The fourth sub-routine of the display unit power control routine controls supply to power on only the third display unit 230. The fifth sub-routine of the display unit power control routine controls supply of power to all of the first display unit 210, the second display unit 220, and the third display unit 230. The display unit power control routine may further include a sub-routine controlling supply of power to only one of the first display unit 210, the second display unit 220, and the third display unit 230.

The data output direction control routine may include a first sub-routine, a second sub-routine, a third sub-routine, a fourth sub-routine, and a fifth sub-routine according to setting the user display mode. In this case, the first sub-routine of the data output direction control routine controls data output according to activation of at least one application program on all of the first display unit 210, the second display unit 220, and the third display unit 230. The second sub-routine of the data output direction control routine controls data output on only the first display unit 210 and the third display unit 230. The third sub-routine of the data output direction control routine controls data output on only the first display unit 210 and the second display unit 220. The fourth sub-routine of the data output direction control routine controls data output on only the second display unit 220 and the third display unit 230. The fifth sub-routine of data output direction control routine controls data output on only one of the first display unit 210, the second display unit 220, and the third display unit 230. Here, respective sub-routines verify the display unit power control routine to control output of data on only currently activated display units.

That is, although a display unit to which data are output is designated according to a composite display operation mode, when a corresponding display unit is turned-off according to a display unit power control mode, the data output direction control routine may stop the data output. Further, the data output direction control routine may control a form and a display direction of data to be output on each display unit according to the number of currently activated application programs. To do this, the data output direction control routine may include a first sub-routine controlling change of a data output direction according to the number of currently activated application programs and a second sub-routine receiving a sensor signal with respect to a terminal operation state from a sensor provided in the terminal 100 and determining a corresponding data display direction based on the sensor signal.

The data memory may store data created during execution of application programs, for example, phone book information, contents information, and recorded or played information. More particularly, the data memory according to an exemplary embodiment of the present invention may store information regarding a composite display operation mode set by the user in a table form. Accordingly, the control unit 160 of the terminal 100 may verify a composite display operation mode table stored in the storage unit 150 and a currently designated composite display operation mode to determine which display unit will be turned-on or turned-off and also may determine which data corresponding to which application program will be output on the turned-on display unit.

The control unit 160 performs an overall control operation of the terminal 100. Moreover, the control unit 160 of the present invention may determine turning-on/off of three-piece display units included in the display means 140 according to a set composite display operation mode, and control data output according to a corresponding composite display operation mode. Here, the control unit 160 may arrange data from a memory allocated for the data output of the display means 140 to be output on the three-piece display units, and control output of the arranged data on corresponding display units. In this case, the control unit 160 may determine an output presence of respective data arranged in the memory according to a display unit determined to be turned-on by the display unit power control routine, and control output of data on only a specific display unit according to the determination.

In more detail, the control unit 160 may verify a current set value of a composite display operation mode or a set value of a composite display operation mode received from the input unit 120 to identify how a current composite display operation mode is set. Furthermore, the control unit 160 may control power supply and data output of a display unit according to the display unit power control mode and the data output direction control mode. For example, when an entire display mode is set, the control unit 160 supplies power to the first to third display units 210, 220, and 230 to control turning-on thereof. Moreover, a first bi-direction display mode is set as the data output direction control mode, the control unit 160 may control data corresponding to an application program output on the first display unit 210 to be equally output on the third display unit 230. When the entire display mode and the second bi-direction display mode are set, the control unit 160 may control data to be output on the second display unit 220 to be equally output on the third display unit 230. When the entire display mode and the third bi-direction display mode are set, the control unit 160 may output data to be output on the first display unit 210 and the second display unit 220 on the third display unit 230.

In the meantime, when a first part display mode is set, the control unit 160 may turn-off the first display unit 210 and control output of data to be output on a corresponding display unit designated according to the data output direction control mode on the first display 210 and the third display unit 230 which are currently turned-on, respectively. For example, when the first part display mode and the first bi-direction display mode are set, the control unit 160 may supply power to the second display unit 220 and the third display unit 230 and control data set to be output on the first display unit 210 to not be output on the first display unit 210, but to be output on only the third display unit 230. In addition, when the first part display mode and the second bi-direction display mode are set, the control unit 160 may supply power to the first display unit 210 and the third display unit 230, and set data to be output on the second display unit 220 not to be output on the second display unit 220 and to be output on only the third display unit 230.

When an input signal with respect to a set variation of a composite display operation mode is generated through the input unit 120 or a menu in a state that a specific display unit is turned-on and specific data are output, the control unit 160 may determine a display unit to be turned-on and a display unit outputting data according to setting a corresponding composite display operation mode, and perform power control of a display unit and data output direction control according to the determined result. Further, the terminal 100 may test an operation state of the terminal 100 using a sensor and control a direction of data to be output on respective display units. For example, while the terminal 100 outputs data to be output on the first display unit 210 and the second display unit 220 to a screen division area of the third display unit 230 divided into a preset direction mode, for example, a traverse mode, when an operation state is changed, it may divide a screen to a vertical mode and control data to be output on the first display unit 210 and the second display unit 220 to be output on the divided screen. In this case, when data activated by one application program are divided into the first display unit 210 and the second display unit 220 to be output on an entire screen, the terminal 100 may control the third display unit 230 to display the data activated by the one application program on the entire screen.

As described above, the terminal 100 according to an exemplary embodiment of the present invention may easily change power supply control of three-piece display units and output direction control of data to be output on the three-piece display units according to setting the composite display operation mode by a user.

Figure 3:
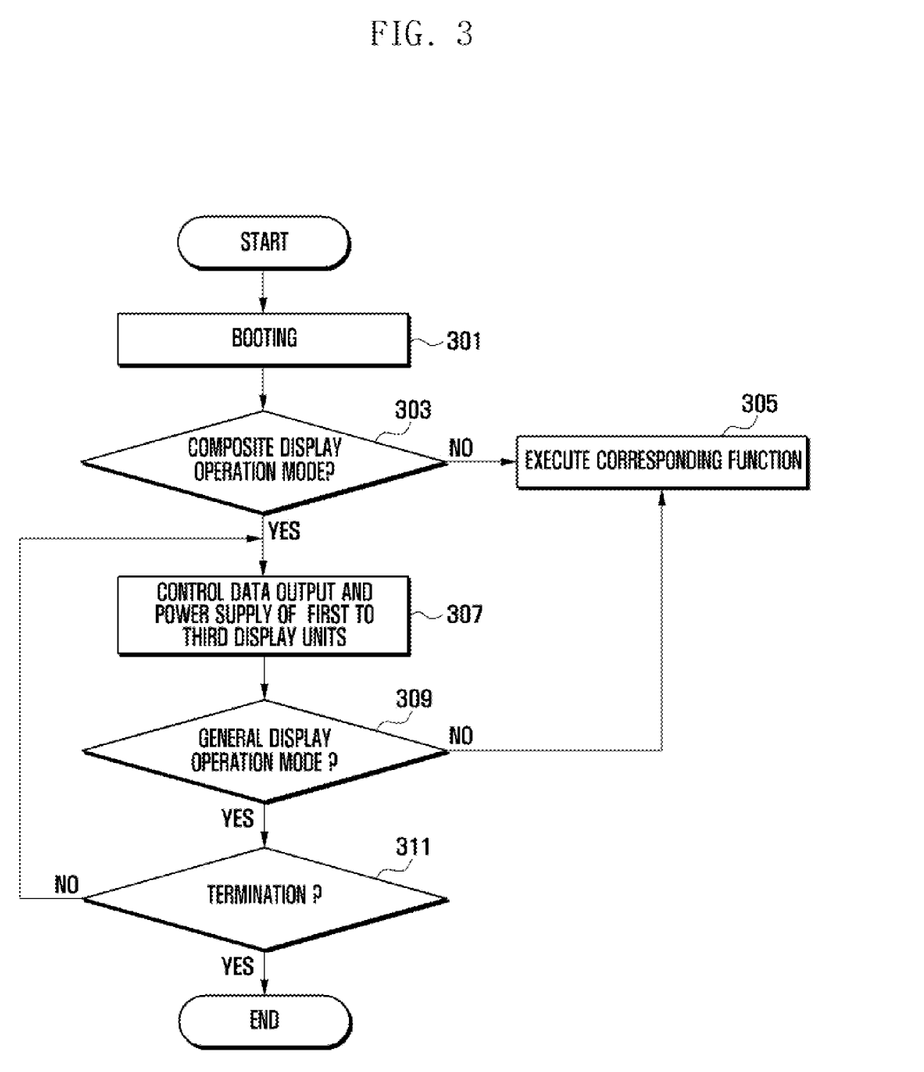
FIG. 3 is a flowchart illustrating a data operation method for a terminal according to an exemplary embodiment of the present invention.

FIG. 3 is a flowchart illustrating a data operation method of a terminal according to an exemplary embodiment of the present invention.

Referring to FIG. 3, in the data operation method for the terminal 100, when power is supplied to the terminal 100, it may perform a booting operation using supplied power at step 301. When the booting operation is achieved, a control unit 160 of the terminal 100 may determine whether a composite display operation mode is set at step 303. If it is determined that the composite display operation mode is not set, the control unit 160 of the terminal 100 may control to perform a default set display operation mode, for example to supply terminal power to only a third display unit 230, to activate functions of the terminal 100, for example, a file play function, a file searching function, a web access function, and a call function, and to output data generated from an activated application program on the third display unit 230 at step 305. Here, the operation of the third display unit 230 does not depend on setting a composite display operation mode but depends on a default set value, and the third display unit 230 may be substituted by another display unit according to a designer's intention or a user's setting.

In the meantime, when the composite display operation mode is set at step 303, the control unit 160 may verify a display mode value of the set composite display operation mode and control data output and power supply of the first to third display units at step 307. In more detail, the control unit 160 may verify a display unit power control mode value to recognize which one of the first to third display units 210, 220, and 230 is set to turned-on in the currently set composite display operation mode. Further, the control unit 160 may control power supply of a corresponding display unit by verifying the display unit power control mode.

Meanwhile, the control unit 160 may control activation of an application program selected according to set schedule information after the booting operation, for example, an idle screen output program or a menu (i.e., a widget) output program. Moreover, the control unit 160 may verify a data output direction control mode value of the composite display operation mode to determine whether to output a screen generated by the application program, for example, an idle screen and a menu screen to one of the display units. For example, when the first part display mode and the first bi-direction display mode are set, the control unit 160 may control supply of power to the second display unit 220 and the third display unit 230, output a menu screen on the second display unit 220, and output an idle screen on the third display unit 230.

Further, when an input signal for changing the composite display operation mode, for example, an input signal for changing a first part display mode to an entire display mode is generated, the control unit 160 may control additional supply of power to the first display unit 210 and output of the idle screen on the first display unit 210. When an input signal for changing the composite display operation mode, for example, an input for changing the first bi-direction display mode to the third bi-direction display mode is additionally generated, the control unit 160 may control output of an idle screen on the first display unit 210, output of an idle screen on the second display unit 220, and output of a division screen of the idle screen and the menu screen on the third display unit 230. Here, the control unit 160 receives one web page from a web server according to activation of an access web function. When the web page is set to be output on an entire screen of the first display unit 210 and the second display unit 220, the control unit 160 may divide a screen of the web page to output a portion of the web page on the first display unit 210 and a remaining portion of the web page on the second display unit 220. Further, the control unit 160 may control output of a screen corresponding to one web page on the third display unit 230.

In the meantime, the control unit 160 may store a composite display operation mode value according to a user request. Upon rebooting of the terminal 100, a corresponding stored value is applied as a default value to be used as a reference value to determine selective power supply of display units and an output direction of specific data. To set the composite display operation mode, the terminal 100 may provide a screen interface including at least one of a specific icon, image, or text corresponding to each display mode through a specific screen to help a user easily recognize the display mode, which display unit is turned-on and in which manner, and which data are output. To do this, the terminal 100 may provide a user interface for setting the composite display operation mode. The user interface may be output on at least one of the first to third display units 210, 220, and 230 according to the user setting.

When a specific input is generated, the control unit 160 may determine whether a generated input signal is an input signal for changing a general display operation mode at step 309. If it is determined that the generated input signal is an input signal for changing a general display operation mode, the control unit 160 may control to provide a function of the terminal 100 according to a default set display mode at step 305.

In contrast, if it is determined that the generated input signal is not the input signal for changing a general display operation mode at step 309, the control unit 160 determines whether a corresponding input signal is an input signal for termination at step 311. When the input signal is not the input signal for termination, the control unit 160 may return to step 307 and control execution of a currently set composite display operation mode and a terminal function support based on a currently generated input signal.

A display control method of a terminal with three-piece display units and a construction and a function of a terminal supporting the same are described above. An example of a user interface based on the above described method and the terminal will be described below.

Figure 4A:
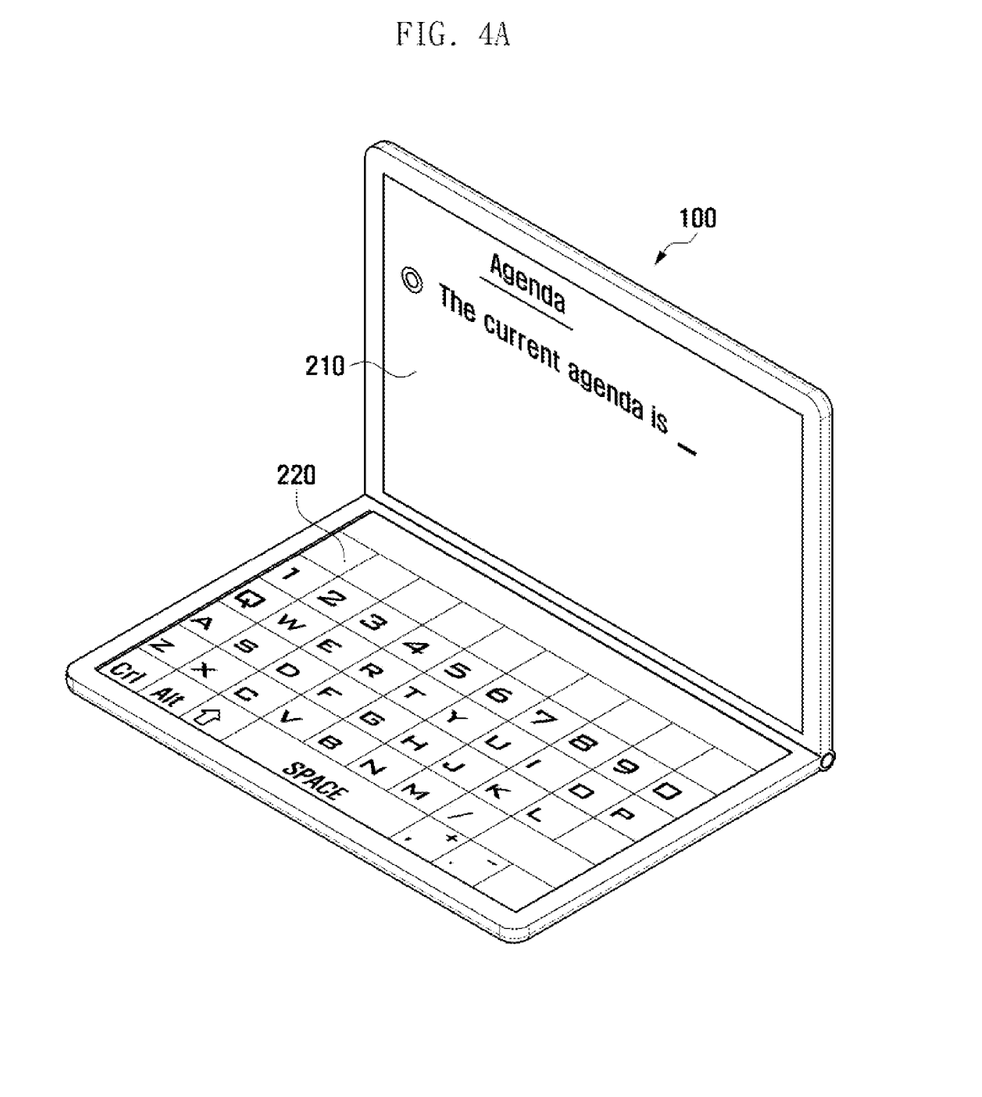
FIG. 4A and FIG. 4B are views illustrating examples of a user interface for data operation in a terminal according to an exemplary embodiment of the present invention.
Figure 4B:
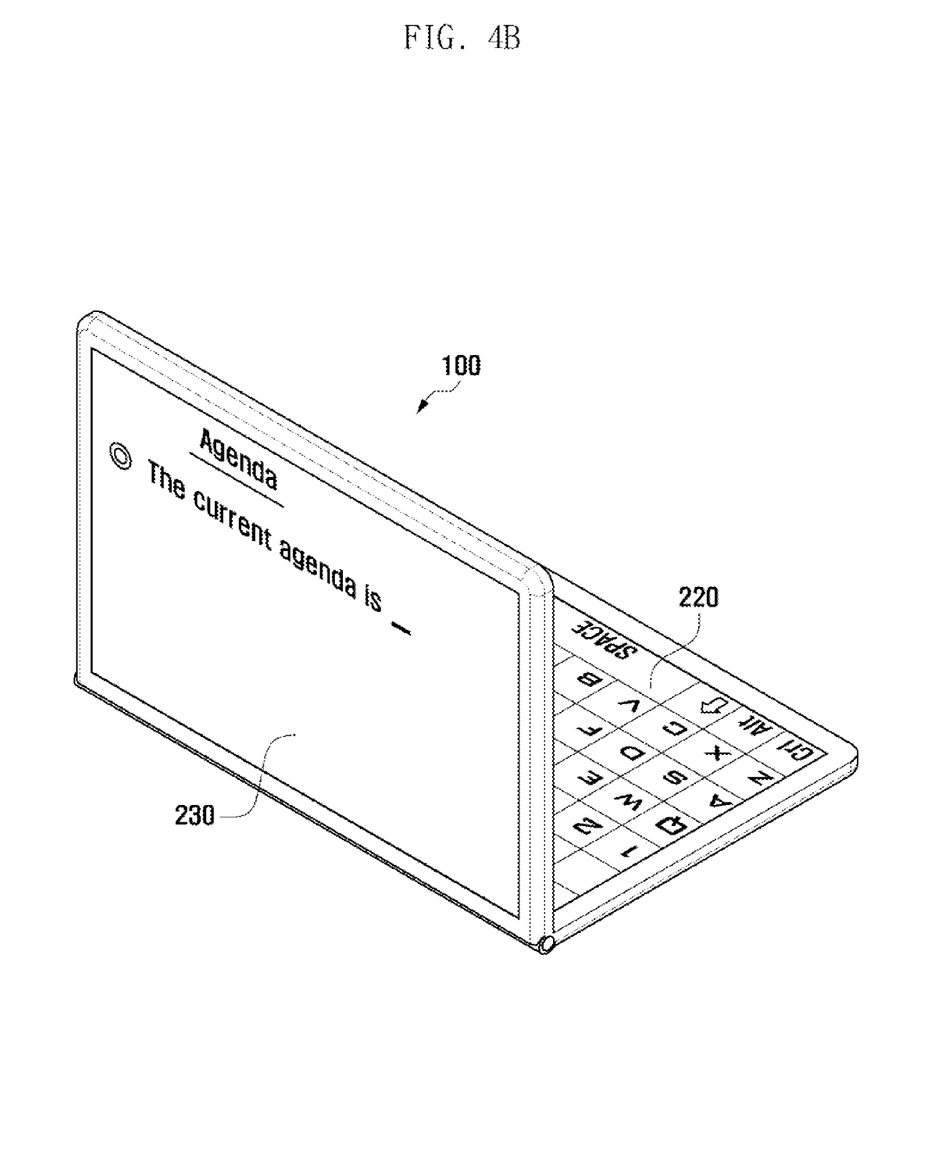

FIG. 4A and FIG. 4B are views illustrating examples of a user interface for data operation in a terminal according to an exemplary embodiment of the present invention.

Referring to FIG. 4A and FIG. 4B, when a user supplies power to the terminal 100, and a booting operation is achieved, the terminal may activate a specific application program, for example, a memo creation program. In this case, the user may set a composite display operation mode with an entire display mode and a first bi-direction display mode. Namely, the user may select a mode controlling supply of power to the first to third display units 210, 220, and 230 during operation of the terminal, and a mode controlling output of the same data on the first display unit 210 and the third display unit 230 at the time of data output.

When a memo creation program is selected and an input signal for activation is generated, as illustrated in FIG. 4A, the terminal 100 controls output of a memo creation window on the first display unit 210 and output of a user interface for input function for memo creation, for example, a QWERTY key pad on the second display unit 220. In this procedure, the terminal 100 may interrupt power supply of a touch panel provided at the first display unit 210 and disregard a touch event generated from the touch panel. Further, the terminal 100 may set a touch panel for operating a QWERTY key pad on the second display unit 220.

In the meantime, the terminal 100 verifies a composite display mode value to control output of a memo creation window to be output on the first display unit 210 on the third display unit 230 as illustrated in FIG. 4B. To do this, the terminal 100 divides a memory area allocated to the display means 140 corresponding to the first to third display units 210, 220, and 230, and arranges data to be output on each display unit at the divided memory areas. By outputting the same data to the first display unit 210 and the third display unit 230 according to a first bi-direction mode set at the composite display operation mode value, the terminal 100 may divide an allocated memory area for the display means 140 into a memory area for the second display unit 200 and a common memory area for the first display unit 210 and the third display unit 230.

A corresponding text is illustrated in FIG. 4A and FIG. 4B to be simultaneously output on the first display unit 210 and the third display unit 230 when a user inputs "The current agenda is" using a QWERTY key pad output on the second display unit 220. When a user receives a specific character using the second display unit 200, the terminal 100 may write a corresponding character in a common memory area, and output a character written in the common memory area on the first display unit 210 and the third display unit 230, respectively.

As described above, the terminal 100 sets a common memory area for the first display unit 210 and the third display unit 230 and outputs data. However, when the sizes of the first display unit 210 and the third display unit 230 differ from each other, memory areas divided for corresponding display units may be defined on a memory area allocated on the display means 140. Moreover, when the terminal allocates a memory area for only the first display unit 210, and outputs data written in the first display unit 210 on the third display unit 230, it performs resizing of corresponding data by referring information related to display unit characteristics of the third display unit 230 and outputs the resized data on the third display unit 230. Characteristics of the display unit include collected information related to a corresponding display unit while initializing during booting of the terminal 100.

As described above, a data operation method for a terminal including three-piece display units and an apparatus thereof may output data by activation of a specific application program according to a set composite display operation mode in various manners. Accordingly, a user verifies data through operation of the second display unit 220 by the first display unit 210 and outputs the checked data on the third display unit 230 such that another user may easily and rapidly confirm corresponding data.

Figure 5A:
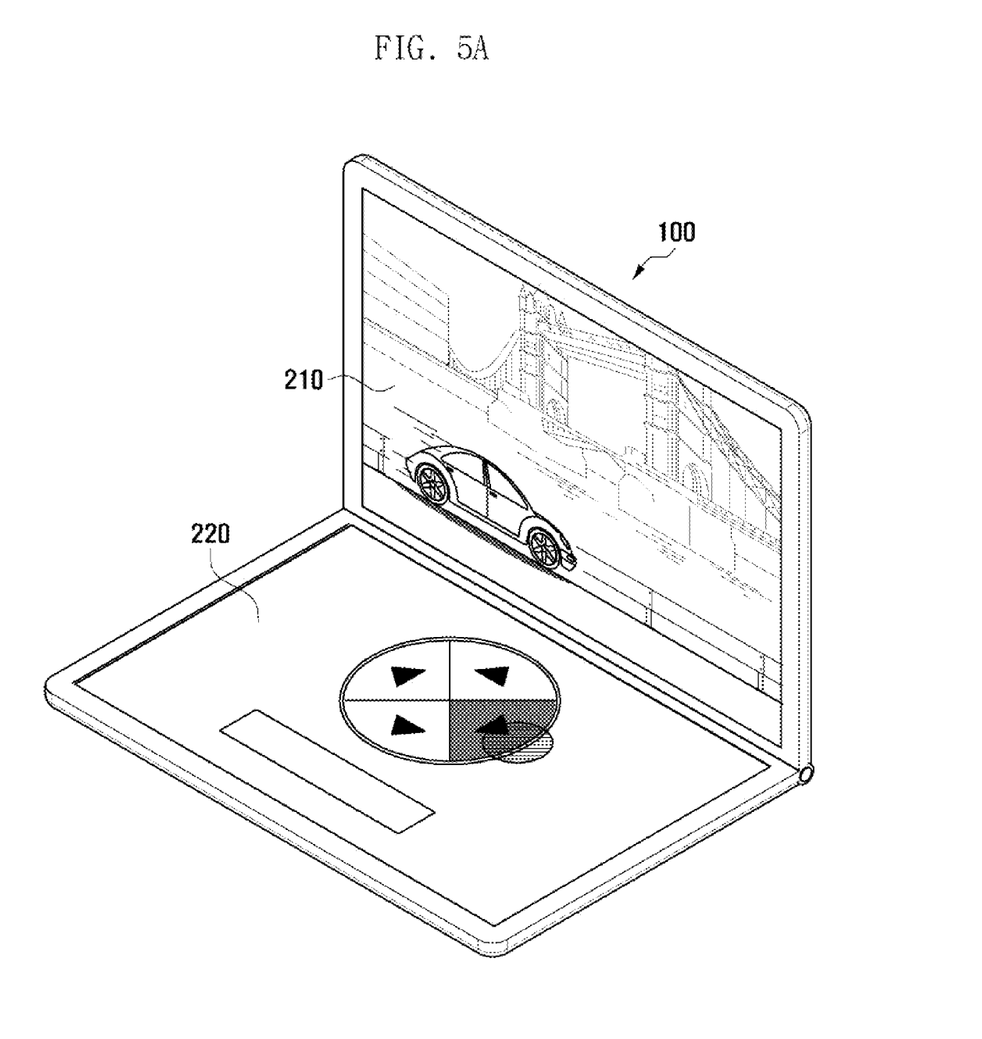
FIG. 5 is a view illustrating an example of a user interface for data operation in a terminal according to a second embodiment of the present invention.
Figure 5B:
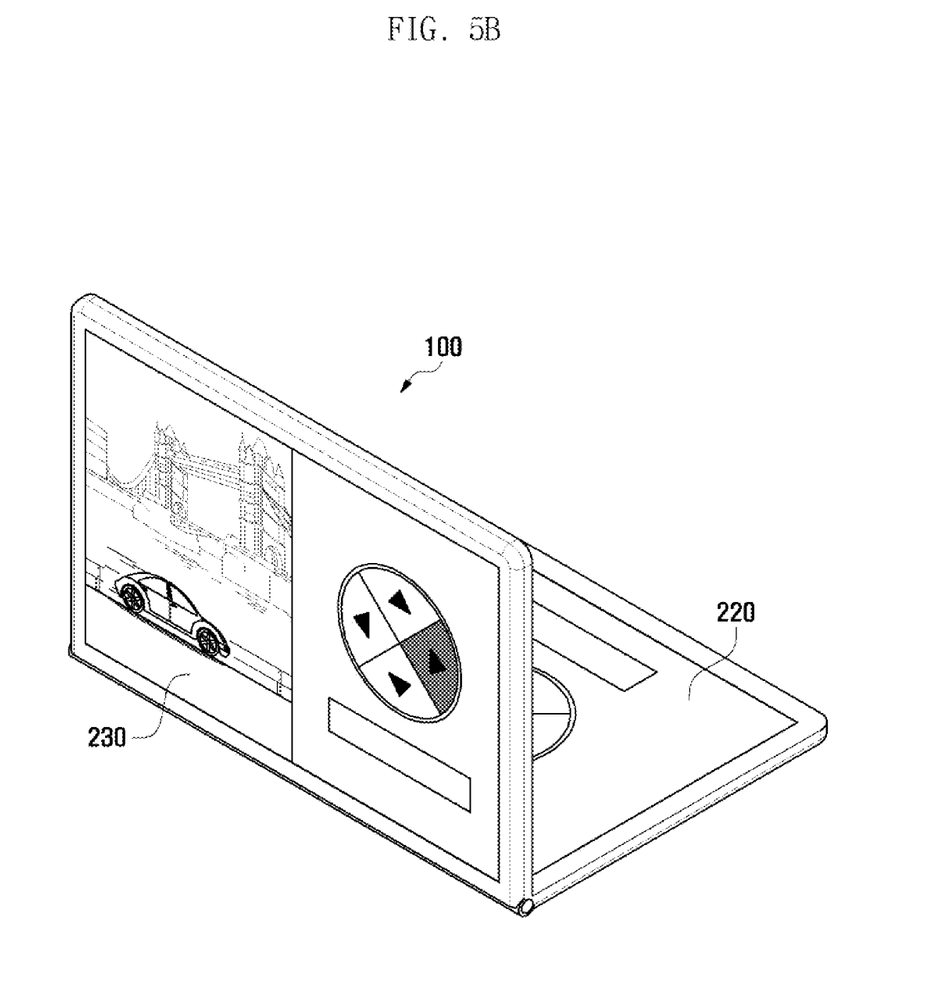

FIG. 5A and FIG. 5B are views illustrating an example of a user interface for data operation in a terminal according to an exemplary embodiment of the present invention.

In an exemplary implementation, a user supplies power to a terminal 100 to activate a game application program by way of example.

Referring to FIG. 5A, to support a game application program selected by a user, the terminal 100 may control the first display unit 210 to output an execution screen necessary for the game application program, and the second display unit 220 to output a control key map screen for playing the game. In this case, the terminal 100 may control operation of the control key map for setting a touch panel of the second display unit 220.

Referring to FIG. 5B, the terminal 100 may divide a screen of the third display unit 230 to simultaneously output an execution screen output of the first display unit 210 and a control key map screen on the second display unit 220, and simultaneously outputs a corresponding execution screen and the control key map screen on the divided screen. In this procedure, the terminal 100 may interrupt power supply to a touch panel disposed on the third display unit 230 and control a touch event generated on the touch panel to be invalid according to user setting. Further, the terminal 100 may set an output area of a control key map corresponding to the second display unit 220 among touch panel areas disposed on the third display unit 230 according to a user setting in which a touch event through a control key map is generated. Accordingly, the user using the third display unit 230 may generate a specific touch event using an output area of a control key map. Furthermore, the terminal 100 may perform resizing of data to be output on each display unit in order to output data to be output on the first display unit 210 and the second display unit 220 to the third display unit 230, and outputs the resized data on the third display unit 230. Accordingly, the user using the third display unit 230 may verify which scheme for using the first display unit 210 operates a control key map on the second display unit 220.

Meanwhile, data to be output on at least one of the first display unit 210 and the second display unit 220 are output on the third display unit 230 are described above. However, the present invention is not limited thereto. That is, the terminal 100 may output a portion of data to be output on the first display unit 210 and a portion of data to be output on the second display unit 220 on the third display unit 230 according to the user setting. For example, assuming that various menu items and specific texts are output on the first display unit 210, the terminal 100 may output only a specific text to be output on the first display unit 210 to the third display unit 230. To do this, the terminal 100 may set a portion of the data output area of the first display unit 210 to be output on the third display unit 230, and allows a user to set the data portion output area.

The user interface has been described based on data output with respect to a memo creation program and a game application program. However, the present invention is not limited thereto. For example, the terminal 100 according to an exemplary embodiment of the present invention may control the first display unit 210 and the third display unit 230 to output screens collected by a camera at the time of generating an input signal for activating a camera function, and control the second display unit 220 to output a control key map for controlling a camera. Accordingly, a user photographed by the camera can easily and rapidly recognize what scheme operates the camera for photographs. Furthermore, the terminal 100 may control the first display unit 210 and the third display unit 230 to output broadcasting signals collected through a specific channel at the time of generating an input signal for activation of a broadcasting receiving function, and controls the second display unit 220 to output a key map for selecting a channel. In this case, the terminal 100 may drive a channel and channel change output on the third display unit 230 independently of the first display unit 210 according to presence of support of the terminal 100 and the user setting. To do this, the terminal 100 may provide a function capable of buffering a plurality of channels. Accordingly, multiple users may watch their desired channels through respective display units, respectively.

The user interface has been described such that a composite display operation mode is set to be divided into a display unit power control mode and a data output direction control mode by way of example. However, the present invention is not limited thereto. Namely, the terminal 100 may provide a specific mode composed of one set of the display unit power control mode and the data output direction control mode. For example, the terminal 100 may define an entire display mode as a mode supplying power to all of the first to third display units 210, 220, and 230 and equally outputting data to be output on the first display unit 210 to the third display unit 230, and provide a corresponding display mode. Furthermore, the terminal 100 may define an entire display mode as a mode supplying power to all of the first to third display units 210, 220, and 230 and outputting data to be output on the first display unit 210 and the second display unit 220 to the third display unit 230.

As illustrated above, the terminal 100 may control the user to set a composite display operation mode of a combination of first various display modes with the display unit power control mode and second various display modes with the data output direction control mode. In this case, as described above, the terminal 100 may support a mode change through a specific key of the input unit 120, an icon output for mode change on the touch screen and a specific mode change according to selection. Moreover, the terminal 100 may provide user interface to which various information for setting a display mode is provided, such that a user may easily recognize information with respect to display power supply and data output direction according to each mode. As described above, an exemplary embodiment of the present invention may support to interrupt power supply of the specific display unit according to selection of a composite display operation mode to save power.

As described above, the terminal 100 may further constructions such as a near distance communication module for near distance communication in a provided form, a camera module photographing still/moving images of a subject, an interface for data transmission/reception due to a wired communication scheme or a wireless communication scheme of the terminal 100, an Internet communication module executing an Internet function communicating with an Internet, digital broadcasting module executing digital broadcasting reception and play functions. Since the structural elements may be variously modified according to a convergence trend of a digital device, all elements cannot be described. Structural elements equivalent to the foregoing structural elements may be included in the portable terminal 100 according to the present invention. Further, the terminal 100 may be substituted by specific constructions in the foregoing arrangements according to the provided form or another structure, which can be easily understood by those skilled in the present art.

In addition, the terminal 100 with a display means including the three-piece display units according to an exemplary embodiment of the present invention may provide a communication service according to various communication schemes. For example, the portable terminal may be applicable to all kinds of information and communication devices and multi-media devices such as a Portable Multimedia Player (PMP), a Personal Digital Assistant (PDA), a smart phone, a Moving Picture Experts Group (MPEG)-1 or MPEG-2 Audio Layer 3 (MP3) player, a portable game terminal, a wired telephone and a wireless telephone, a Smart Phone, and the like, and applications thereof as well as all mobile communication terminals operating based on communication protocols corresponding to various communication systems.

While the invention has been shown and described with reference to certain exemplary embodiments thereof, it will be understood by those skilled in the art that various changes in form and details may be made therein without departing from the spirit and scope of the present invention as defined in the appended claims and their equivalents.

What is claimed is:

1. A data operation method for a foldable terminal including three-piece display units, a first display unit and a second display unit are placed on an inner surface of the terminal and a third display unit is placed on an outer surface of the terminal, the method comprising:

selecting at least one of setting a display unit power control mode used for controlling power supplied to at least one of the three-piece display units and setting a data output direction control mode used for instructing data to be output, which is generated according to activation of an application program, to the at least one of the three-piece display units; and outputting the data generated by the activated application program to the at least one of the three-piece display units, according to at least one of the display unit power control mode and the data output direction control mode, wherein the outputting of the data generated by the activated application program comprises:

outputting, according to at least one of the display unit power control mode and the data output direction control mode, a window including a user interface for receiving user input to the second display unit, and a window including an output corresponding to the received user input to at least one of the first and third display units; and outputting, according to at least one of the display unit power control mode and the data output direction control mode, a window including a divided portion of the data generated by the activated application program to the first display unit, and a window including remaining divided portion of the data generated by the activated application program to the second display unit.

2. The method of claim 1, wherein the selecting of at least one of setting the display unit power control mode and setting the data output direction control mode comprises at least one of:

setting an entire display mode in which power is controlled to be supplied to all the three-piece display units, in a state where the first display unit and the second display unit of the three-piece display units are disposed adjacent to each other, and the third display unit is disposed on an opposite side of one of the first display unit and the second display unit;

setting a first part display mode in which a supply of power to the first display unit is interrupted and power is supplied to the second display unit and the third display unit;

setting a second part display mode in which a supply of power to the second display unit is interrupted and power is supplied to the first display unit and the third display unit;

setting a third part display mode in which a supply of power to the first display unit and the second display unit is interrupted and power is supplied to the third display unit; and setting a standard power display mode in which power is supplied to only the first display unit and the second display unit.

3. The method of claim 2, further comprising:

generating an input signal for changing the display unit power control mode;

changing the display unit power control mode according to the input signal; and at least one of turning-on and turning-off a display unit designated according to the changed display unit power control mode.

4. The method of claim 1, wherein the selecting of at least one of setting the display unit power control mode and setting the data output direction control mode comprises at least one of:

setting a standard output display mode in which data is controlled to be output to only the first display unit and the second display unit in a state where the first display unit and the second display unit of the three-piece display units are disposed adjacent to each other, and the third display unit is disposed on an opposite side of one of the first display unit and the second display unit;

setting a first bi-direction display mode in which the same data to be output on the first display unit is output on to the third display unit;

setting a second bi-direction display mode in which the same data to be output on the second display unit is output on the third display unit; and setting a third bi-direction display mode in which the same data to be output on the first display unit and the second display unit is output on the third display unit.

5. The method of claim 4, further comprising:

generating an input signal for changing the data output direction control mode;

changing the data output direction control mode according to the input signal; and controlling output of data to a display unit designated in the changed data output direction control mode.

6. The method of claim 4, further comprising outputting data according to setting the third bi-direction display mode, wherein the outputting of the data comprises dividing a screen of the third display unit, and dividing and outputting data to be output on the first display unit and data to be output on the second display unit on the respective divided screens.

7. The method of claim 6, further comprising detecting an operation state of the terminal, wherein the outputting of the data comprises changing and outputting an output direction of the data to be output on the third display unit to at least one of a transverse mode and a longitudinal mode according to the operation state of the terminal.

8. The method of claim 4, further comprising outputting data according to setting the third bi-direction display mode, wherein the outputting of the data comprises outputting data generated according to activation of one application program to the first display unit and the second display unit with an entire screen, and outputting the data to the third display unit.

9. A foldable terminal including three-piece display units, the terminal comprising:

a first display unit and a second display unit disposed adjacent to each other on an inner surface of the terminal;

a third display unit disposed on an outer surface of the terminal;

a storage unit configured to store at least one of a display unit power control mode controlling power supplied to at least one of the first display unit, the second display unit, and the third display unit and a data output direction control mode used for instructing data to be output, which is generated according to activation of an application program, to at least one of the first display unit, the second display unit, and the third display unit;

a control unit configured to control outputting of the data generated by the activated application program to at least one display unit, according to at least one of the display unit power control mode and the data output direction control mode; and at least one of an input unit and a touch screen for receiving an input, wherein the outputting of the data generated by the activated application program comprises:

outputting, according to the at least one of the display unit power control mode and the data output direction control mode, a window including a user interface for receiving a user input to the second display unit, and a window including an output corresponding to the received user input to at least one of the first display unit and the third display unit; and outputting, according to the at least one of the display unit power control mode and the data output direction control mode, a window including a divided portion of the data generated by the activated application program to the first display unit, and a window including remaining divided portion of the data generated by the activated application program to the second display unit.

10. The terminal of claim 9, wherein the display unit power control mode comprises at least one:

an entire display mode in which power is controlled to be supplied to all the three-piece display units;

a first part display mode in which a supply of power to the first display unit is interrupted and power is supplied to the second display unit and the third display unit;

a second part display mode in which a supply of power to the second display unit is interrupted and power is supplied to the first display unit and the third display unit;

a third part display mode in which a supply of power to the first display unit and the second display unit is interrupted and power is supplied to the third display unit; and a standard power display mode in which power is supplied to only the first display unit and the second display unit.

11. The terminal of claim 10, further comprising at least one of an input unit and a touch screen generating an input signal for changing the display unit power control mode, wherein the control unit controls changing the display unit power control mode according to the input signal, and at least one of turning-on and turning-off a display unit designated according to the changed display unit power control mode.

12. The terminal of claim 9, wherein the data output direction control mode comprises at least one:

a standard output display mode in which data is controlled to be output to only the first display unit and the second display unit;

a first bi-direction display mode outputting the same data as that to be output on the first display unit to the third display unit;

a second bi-direction display mode in which the same data to be output on the second display unit is output on the third display unit; and a third bi-direction display mode in which the same data to be output on the first display unit and the second display unit is output on the third display unit.

13. The terminal of claim 12, further comprising at least one of an input unit and a touch screen for generating an input signal for changing the data output direction control mode, wherein the control unit controls changing the data output direction control mode according to the input signal, and output of data to a display unit designated in the changed data output direction control mode.

14. The terminal of claim 12, wherein the control unit divides a screen of the third display unit, and divides and outputs data to be output on the first display unit and data to be output on the second display unit on the respective divided screens.

15. The terminal of claim 14, comprising a sensor for detecting an operation state of the terminal, wherein the control unit changes and outputs an output direction of the data to be output on the third display unit to at least one of a transverse mode and a longitudinal mode according to the operation state of the terminal.

16. The terminal of claim 12, wherein the control unit outputs data generated according to activation of one application program to an entire screen of the third display unit when the third bi-direction display mode is set and the data are output to the first display unit and the second display unit with an entire screen.

* * * * *